United States Patent [19]
Bernard, II et al.

[11] Patent Number: 4,909,697
[45] Date of Patent: Mar. 20, 1990

[54] AUTOMATED WORK STATION

[75] Inventors: Clay Bernard, II, Point Richmond; Robert D. Lichti, Lakewood, both of Calif.

[73] Assignee: Computer Aided Systems, Inc., Hayward, Calif.

[21] Appl. No.: 233,996

[22] Filed: Aug. 15, 1988

Related U.S. Application Data

[63] Continuation of Ser. No. 815,808, Jan. 2, 1986, abandoned.

[51] Int. Cl.⁴ .............................................. B65G 1/10
[52] U.S. Cl. .................................... 414/331; 198/341; 198/457; 198/346; 198/586; 198/536; 198/463.3; 198/460; 53/251; 53/391; 414/660; 414/267; 414/278; 414/276; 414/222; 187/17
[58] Field of Search ............... 414/331, 276, 272, 268, 414/267, 278, 277, 286, 659, 660, 662, 672, 222; 198/463.3, 586, 592, 536, 535, 346, 341, 451, 460; 187/17, 9 R, 9 E; 193/355 S; 186/4, 5, 6; 53/250, 249, 235, 251, 391, 390

[56] References Cited

U.S. PATENT DOCUMENTS

| 1,525,870 | 2/1925 | Lee | 198/463.3 |
| 2,353,638 | 7/1944 | Beaulieu et al. | 198/341 |
| 3,133,622 | 5/1964 | Immesberger | 198/346 X |
| 3,268,055 | 8/1966 | Stein et al. | 198/451 |
| 3,379,321 | 4/1968 | Weir | 414/267 X |
| 3,534,850 | 10/1970 | Rogers et al. | 198/301 |
| 3,670,867 | 6/1972 | Traube . | |
| 3,792,757 | 2/1974 | Musser | 198/536 X |
| 3,792,785 | 2/1974 | Weir | 414/278 |
| 3,928,114 | 12/1975 | Aylon | 198/586 X |
| 4,013,186 | 3/1977 | Barton et al. | 414/660 X |
| 4,192,496 | 3/1980 | Baselice et al. | 198/463.3 X |
| 4,227,607 | 10/1980 | Malavenda | 198/460 |
| 4,239,436 | 12/1980 | Wildenaur | 414/278 X |
| 4,379,671 | 4/1983 | Cochran | 414/331 |
| 4,492,504 | 1/1985 | Hainsworth | 414/278 X |

FOREIGN PATENT DOCUMENTS

| 424919 | 9/1924 | Fed. Rep. of Germany | 198/787 |
| 1343507 | 10/1963 | France | 198/346 |
| 755693 | 8/1980 | U.S.S.R. | 414/276 |

Primary Examiner—Frank E. Werner
Attorney, Agent, or Firm—Flehr, Hohbach, Test, Albritton & Herbert

[57] ABSTRACT

An automated work station which may be used when needed in conjunction with two vertical temporary holding conveyors makes use of a tiltable table and associated transition table for each conveyor. One tiltable table is shifted to a first upper horizontal position to receive empty boxes, one at a time, from its vertical conveyor. The other tiltable table is shifted to a first upper horizontal position to receive box units in which have been stored supply quantities of the different material items from which the operator selects specified quantities of items and places those items in the empty box units until an order is filled. The tiltable tables each have a tilted position for the operator's convenience while the boxes are being unloaded and loaded. When a box unit is to leave the tiltable table, the table is again tilted to a second and lower horizontal position from which the box unit is moved to a second lower horizontal level of the transition table. At that second lower horizontal level there are two intermeshing traction platforms, both power operated. If the box is to be returned to the vertical conveyor, it will rest on one of the intermeshing traction platforms and will be passed to the vertical conveyor. If the box is to be sent away it will rest on the other of the intermeshing traction platforms and passed in a right angular direction to a horizontal conveyor which takes it away.

12 Claims, 10 Drawing Sheets

AUTOMATED WORK STATION

This is a continuation of application Ser. No. 815,808 filed Jan. 2, 1986, now abandoned.

BACKGROUND OF THE INVENTION

Multi-level storage conveyors for the storage of box-type containers is a widely used and acceptable storage expedient, especially for handling relatively small articles such as can be packed in a box. As the demand for such articles has increased in quantity and variety, the problem of insertion and extraction of containers into and out of conveyors has increased proportionately. Mechanisms are and have been available for performing insertion and extraction functions with respect to such rotary conveyors, and have been acceptable where time has not been of major concern. Many of such operable mechanisms, however, are no longer acceptable because designs do not lend themselves to the accelerated operation which is increasingly in demand.

Another practice heretofore acceptable has been that of devoting abundant floor space to material handling operations which accompany storage of containers of the type made reference to. The increasing cost of space and the cost of moving material about the available space has become an increasingly objectionable factor in this field.

Still another factor which affects acceptability of currently available multi-level rotary storage installations is that many available designs are not sufficiently compatible with newly devised automatic handling systems, especially those which have become increasingly popular as a result of newly developed electronic systems.

It is therefore among the objects of the invention to provide a new and improved automated work station capable of use in connection with a multi-level rotary storage conveyor which substantially increases the speed with which material extracted from the conveyor can be handled.

Another object of the invention is to provide a new and improved automated work station capable of use with a multi-level rotary storage conveyor which is appreciably versatile in its ability to accept containers, position containers for work, and then, in the alternative, either return containers to the storage facility or pass them on for disposition.

Still another object of the invention is to provide a new and improved automated work station for use with multi-level rotary storage conveyors which is readily adaptable to accept containers from the conveyor, whatever it may be, and thereafter dispose of such containers to whatever disposition means might be desirable.

Further included among the objects of the invention is to provide a new and improved automated work station for the handling of box-like containers which, in addition to adjustments needed for the acceptance and disposal of containers, is also capable of being adjusted to the comfort needs of the operator, thereby to appreciably accelerate the number of such containers which can be handled by an individual in a given length of time.

Further among the objects of the invention is to provide a new and improved automated work station for the handling of box-like containers, the various phases and functions of which are power operated irrespective of the container size for which the work station has been designed.

Further still among the objects of the invention is to provide a new and improved automated work station for the handling of box-like containers delivered to it from multi-level rotary storage conveyors which can be built and make subject to operation in a relatively small space and by use of a conventionally powered mechanism of relatively simple design and construction.

With these and other objects in view, the invention consists of the construction, arrangement and combination of the various parts of the device, serving as an example only of one or more embodiments of the invention, whereby the objects contemplated are attained as hereinafter disclosed in the specification and drawings, and pointed out in the appended claims.

In an embodiment of the invention chosen for the purpose of illustration, two identical work stations 10 and 11 with identical vertical conveyors or random vertical queues 12 and 13 serving them are shown, see FIGS. 1, 2, 4 and 5. There is a horizontal inflow conveyor 14 with branches 15 and 16 serving the respective vertical conveyors 12 and 13. A horizontal outflow conveyor 17 has a loading end 19 adjacent the work stations and a more remotely disposed end 19'. Material transport units 18, multiple in number, are shown in various positions on the conveyors and at the work stations. Additional particulars with respect to a work station 11 taken as an example are shown in FIGS. 7 through 13, inclusive.

Immediately adjacent a work area 20 there is a work table, indicated by the reference character 21, consisting in the main of a shelf structure 32 and associated platform 22 carried by a table mechanism 23, mounted on a supporting base 24. Between the work table 21 and its vertical conveyor 12 is a transition table 25. The transition table 25 is shown advantageously in FIG. 3, wherein a showing of the work table has been dispensed with in order to more readily portray the structure of the transition table. An upper platform at the location 26 and a lower platform at the location 27 supported, for example, by corner posts 28 comprise broadly the transition table. The upper platform 26 consists generally of a pair of chain drive transfer belts 29 which are aligned in receiving relationship from the adjacent edge of stations on the vertical conveyor 13 which carry the material transport units 18. The upper platform 26, moreover, is located at an elevation which is coincident with the elevation of that station of the vertical conveyor 13 which is the station immediately above the lowermost station on the side of the vertical conveyor which faces the work table 21. With this being the position of the upper platform 26, material transport units 18 can readily be slid from their station on the vertical conveyor to a position supported by the upper platform 26 and its pair of chain drive transfer belts.

Figure 1:
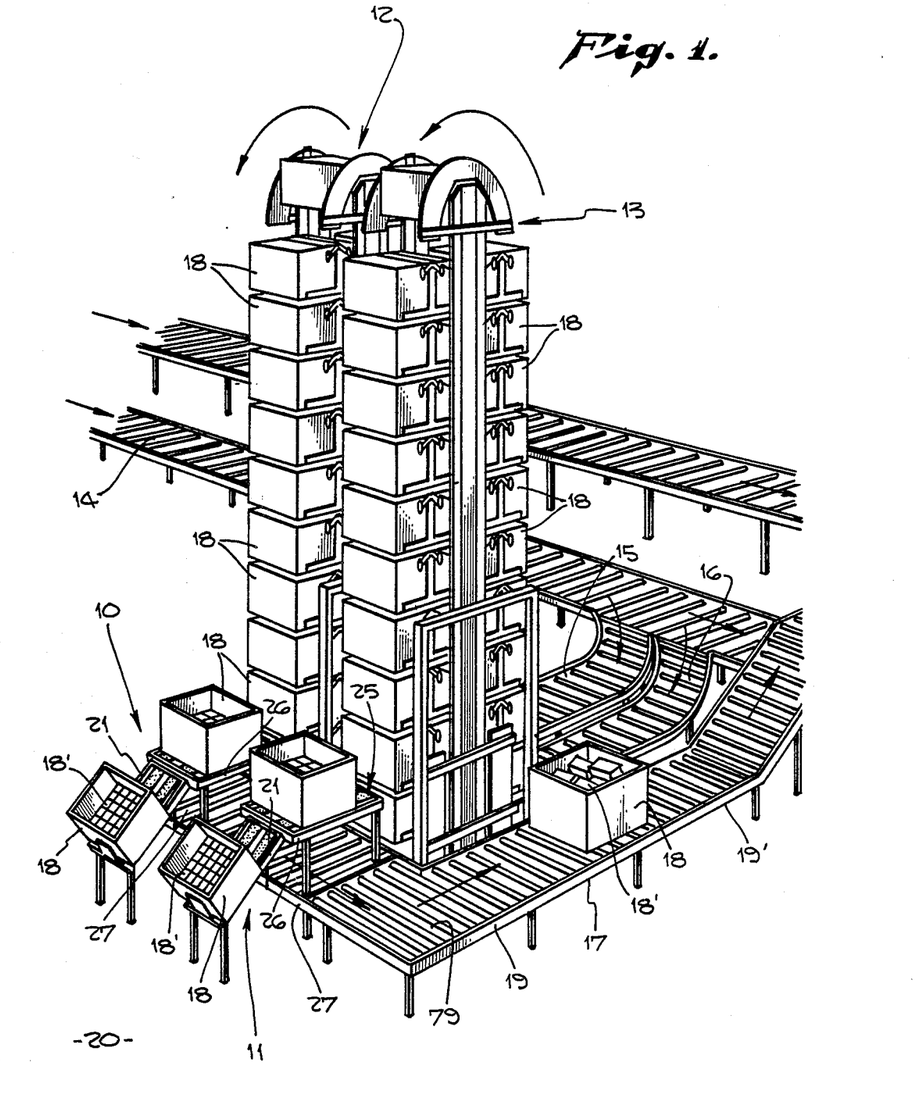
FIG. 1 is a front perspective view of two automated work stations shown, each in company with an appropriate vertical conveyor and related horizontal conveyors.
Figure 2:
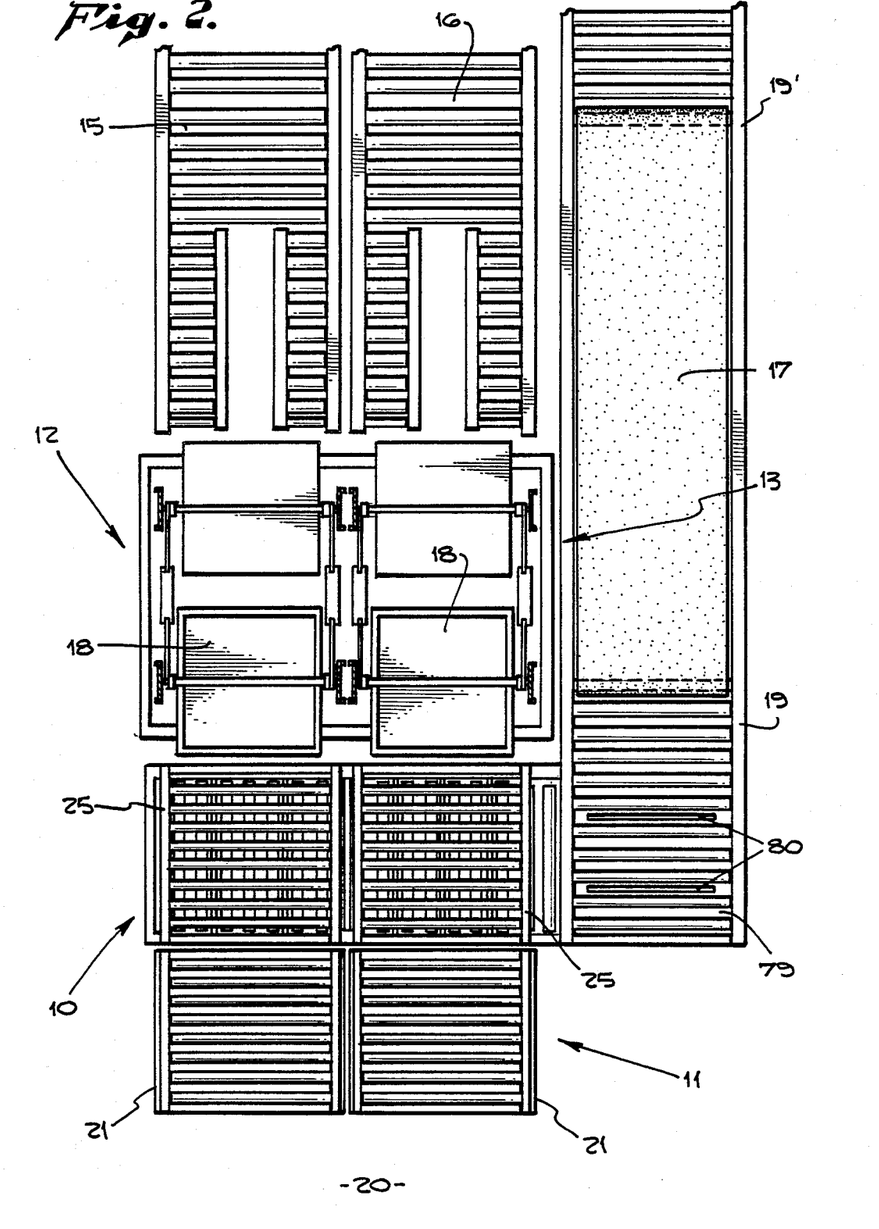
FIG. 2 is a plan view of the work stations showing the relationship of the various functions.
Figure 3:
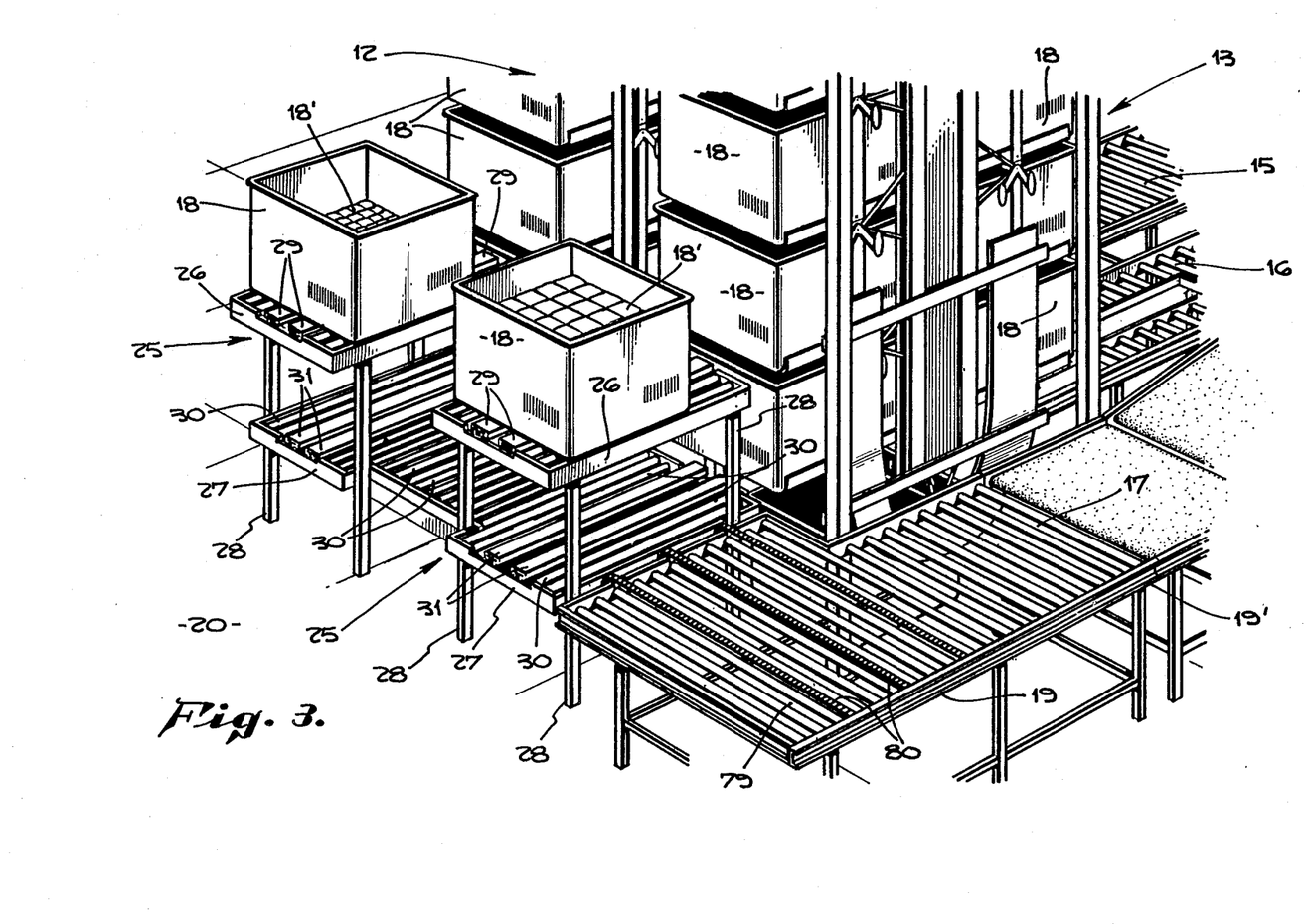
FIG. 3 is a front perspective view of a portion of the work station with other portions removed for easy visibility.
Figure 4:
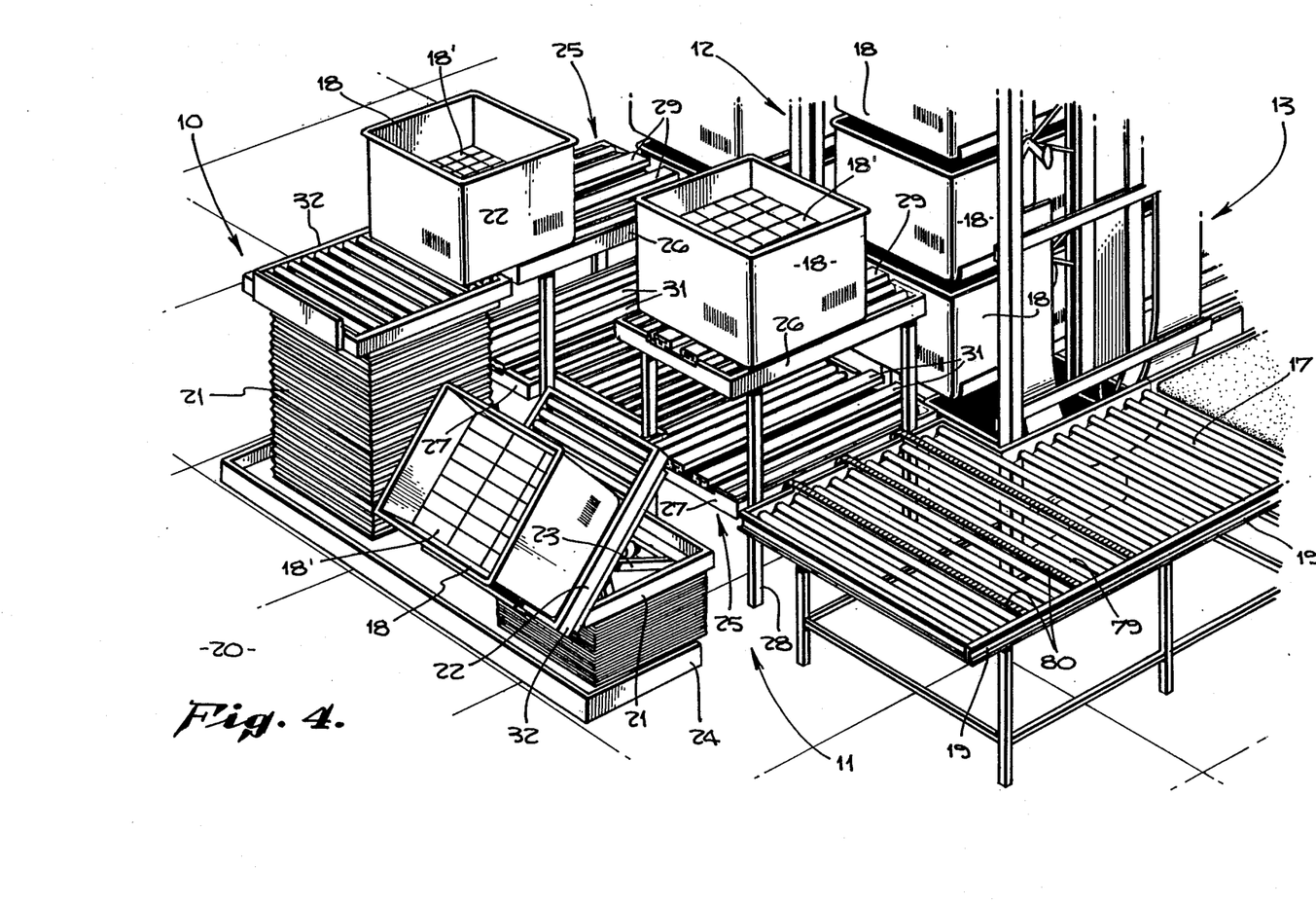
FIG. 4 is a front perspective view of the work station and with all parts in place and in one attitude of operation.

The lower platform 27 is of more composite construction in that it consists of a pair of chain drive transfer belts 31 intermeshed between pairs of horizontally spaced parallel traction rollers 30. In this intermeshed relationship, the chain drive transfer belts may be defined as having a pop-up capability in that they can be lifted so that the upper faces are in fact in a position acting as a temporary platform to support the material transport units when they reach the lower platform 27. In that arrangement the transfer belts are actually capable of carrying the material transport unit in a direction at right angles to the direction in which it is moved by the traction rollers 30.

When there is need to have the unit moved in a direction permitted by rotation of the rollers 30, the chain drive transfer belts are so constructed that they can be lowered until the upper level of the belts is below the topmost surface of the rollers. The units resting on rollers 30 acting as a temporary platform are then free to be moved by the rollers instead of the transfer belts, obviously in a direction at right angles to what movement is experienced when the units are carried by the transfer belts. By having the transfer belts power operated by one source, and the rollers 30 power operated by another source, the unit can be moved in one direction or another subject to a desired program and application of power.

Among those occasions when a unit 18 is to be returned to the random vertical queue is one where the unit has been only partially emptied of its contents, identified generally as items 18', and is to be temporarily stored until needed again. Another occasion occurs when filling of the unit 18 with a selection of items has not been completed and it is convenient to hold the unit temporarily on the random vertical queue until called for in order to complete filling of the unit with its assortment of items. Once the filling is completed, the unit will be diverted laterally in a right angular direction away from the random vertical queue and ultimately to the outflow conveyor 17.

As shown in FIGS. 7 through 13 in greater particular, the mechanism 23 of the work table 21 is of a character enabling the platform 22 to be moved to a position at the same level as the upper platform 26 of the transition table of the lower platform 27, in addition to other positioning attributes of the work table.

Figure 9:
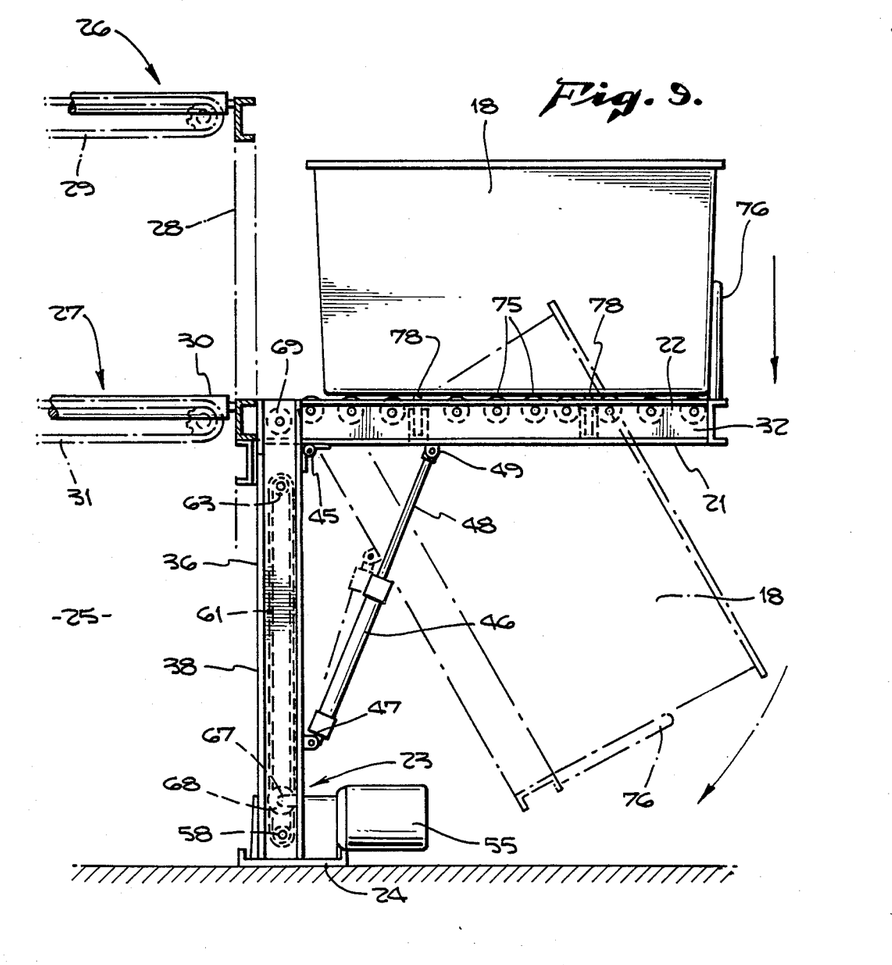
FIG. 9 is a side elevational view of the work table on the line 9—9 of FIG. 7.
Figures 10, 11:
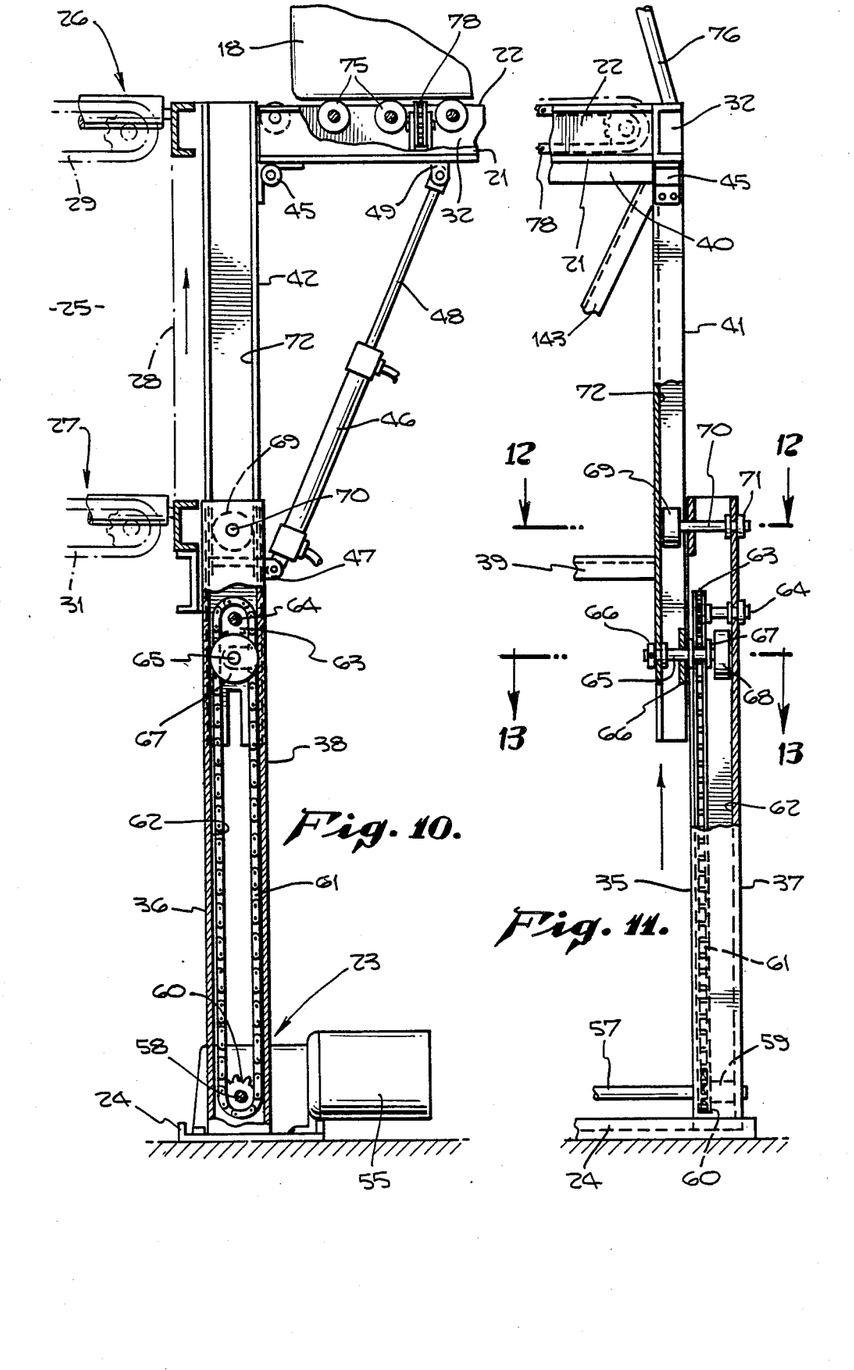
FIG. 10 is a fragmentary vertical side sectional view of a mechanized leg of the work table.
FIG. 11 is a fragmentary vertical front sectional view of a mechanized leg.
Figure 12:
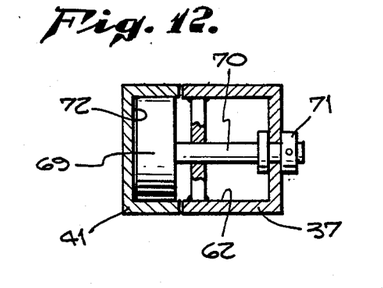
FIG. 12 is a cross-sectional view on the line 12—12 of FIG. 11.
Figure 13:
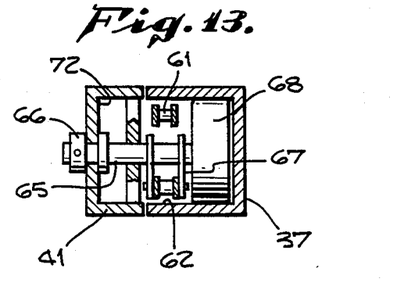
FIG. 13 is a cross-sectional view on the line 13—13 of FIG. 11.

To accomplish the purpose served by the work table, the platform 22 is supported by a pair of racks in the form of articulated leg assemblies 35 and 36. Structure comprising the articulated leg assemblies consists in part of a hollow column 37 for the leg assembly 35 and a similar hollow column 38 for the leg assembly 36. For supporting the platform 22 at the rear, there is a lower beam 39, an upper beam 40, and side elements 41 and 42 connected together with triangular braces 43 and 44. The platform 22 is connected to the upper beam 40 and columns 37 and 38 by means of a hinge 45. This enables the platform 22 to be tilted between a horizontal position, as shown in FIGS. 9 and 10, and an extreme tilted position, as shown by the broken lines in FIG. 9. Tilting is accomplished by use of a hydraulic ram 46, the cylindrical portion of which is pivotally attached by a bracket 47 to the lower beam 39. A piston 48 of the hydraulic ram is pivotally attached by means of a bracket 49 to the platform 22.

In addition to the tilting activity just made reference to, it is additionally of consequence to be able to move the platform 22 from a lowermost level, as shown in FIG. 9, to an uppermost level, as indicated in FIGS. 10 and 11. The shift between lowermost and uppermost positions is accomplished by use, for example, of an electric motor 55 attached to the supporting base 24.

Extending from the motor drive shaft 56 on one side of the motor is a driven shaft 57 which communicates with a chain operated mechanism within the column 37. A driven shaft 58 on the opposite side is in communication with a chain driven mechanism in the other column 38.

Figure 8:
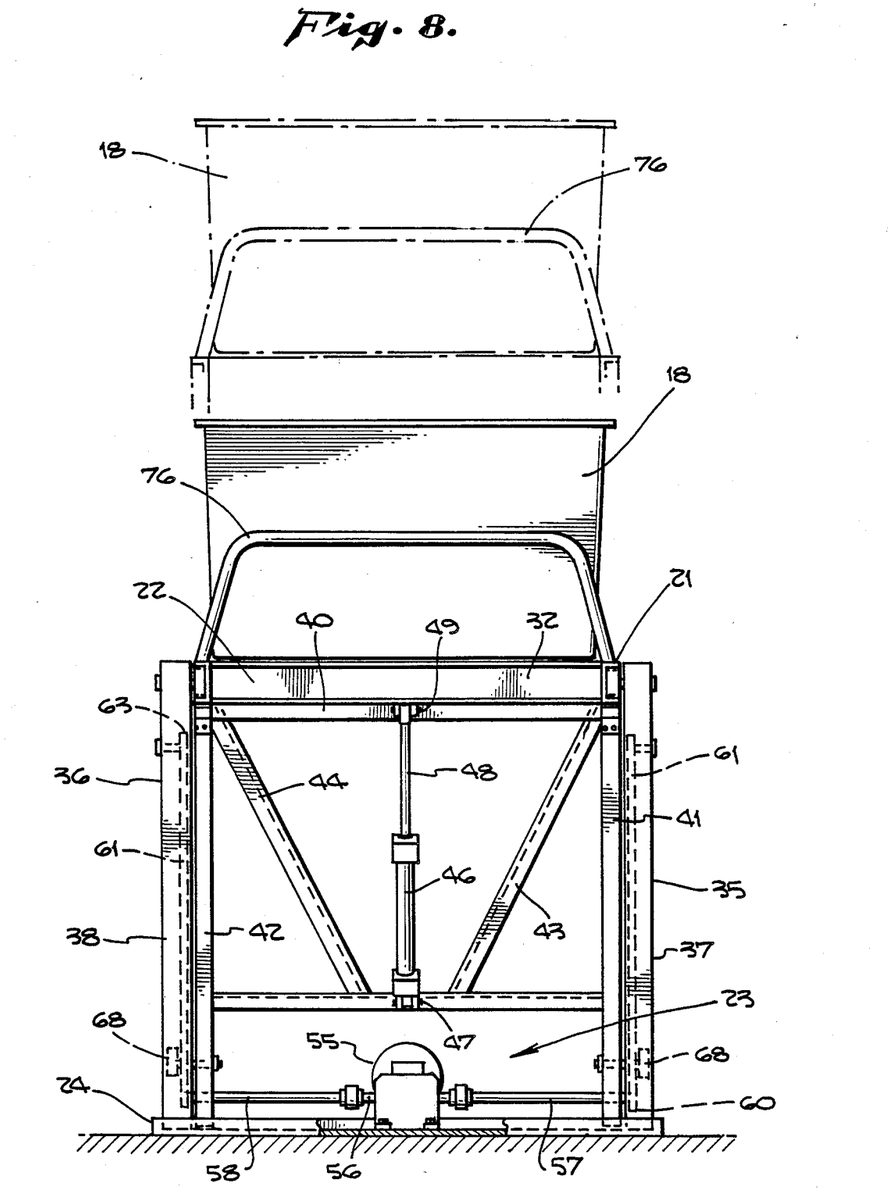
FIG. 8 is a front elevational view of the work table on the line 8—8 of FIG. 7.

On the right-hand side, by way of example, as viewed in FIGS. 8 and 11, the driven shaft 57, journalled as shown by a bushing 59 at the bottom of the column 37, has mounted thereon a gear 60 keyed to the shaft. An endless chain 61 driven by the gear 60 extends upwardly within a chamber 62 in the column 38 to engagement with an idler gear 63 on a stub shaft 64 secured within the chamber 62.

To implement moving the work table 21 up and down, there is at the bottom of the side element 41 a traveling shaft 65 extending transversely from a bushing 66 through a panel 66' and into the chamber 62 where it is journaled in a traveling bracket 67. The traveling bracket 67 is in turn attached to the adjacent link of the endless chain 61 so that, as viewed in FIG. 10, the traveling bracket is attached to the right-hand loop of the chain at the uppermost of its operative positions.

As better shown in FIG. 11, there is a roller 68 mounted at the adjacent end of the traveling shaft 65, the roller being adapted to rotate on one side of the chamber 62 as the traveling bracket 67 and the roller moves up and down by action of the driven shaft 57 and its gear 60. In this connection it should be appreciated that the chain drive mechanism within the column 38 is the same in all operative respects as within the column 37 except for left and right-hand rotation. Operating as described, the roller 68 acts to stabilize the lower ends of the side elements 41 and 42. Additional stabilization is provided by a roller 69 mounted on a shaft 70, in turn contained with a bushing 71 at the top of the column 37, as viewed in FIG. 11. On this occasion, the roller 69 rolls within a channel 72, for example, in the side element 41. A similar roller 69 rolls or travels in a comparable channel 72 in the side element 42. It follows, therefore, that by simultaneous operation of the two driven shafts 57 and 58 and corresponding gear 60, the endless chain 61 will carry the traveling bracket 67 on both sides upwardly or downwardly.

As viewed in FIGS. 10 and 11, the traveling brackets 67, being in uppermost position, will have moved the platform 22 of the work table 21 to its uppermost level. Clockwise rotation of the gear 60 thereafter will drive the endless chain 61 in a direction so that the traveling brackets 67 will be carried downwardly to the lowermost position, namely, the position shown in FIG. 9. In that position the platform 22 will be at its lowermost level. By appropriate manipulation of the electric motor 55, the location of the platform 22 can be shifted to any level intermediate uppermost and lowermost positions as heretofore described.

The work table 21 and its platform 22 heretofore identified is provided with a set of traction rollers 75 which accept the material transport unit 18 and are capable when the platform is horizontally disposed of drawing it into position on the platform until it engages the stop bar 76. The traction rollers driven by an endless chain (not shown) are also capable of returning the material transport unit 18 to the transition table 25 when necessary.

For those occasions when there is need to shift the material transport unit 18 in a direction at right angles with respect to the direction of travel when on the rollers 75, there is provided a pair of chain drive belts 78 which have the pop-up capability previously made reference to so that they can be raised to a level higher than the top level of the traction rollers 75, there to engage the bottom of the material transport unit 18.

After the unit 18 has served the purpose for which it has been called to the tilt position of FIG. 9, it may be returned to the transition table 25. This is accomplished by lowering the platform 22 to the level of the lower platform 27. At the lower level the set of traction rollers 75 by reverse operation assists in returning the unit 18 from the work table 21 to the lower platform 27 of the transition table. Once on the lower platform 27, the unit 18 can be returned to the vertical conveyor 13 by operation of the chain drive transfer belts 31. In the alternative, the unit 18 can be diverted from the transition table 25 on the rollers 30 to a receiving station 79 of the outflow conveyor 17, see FIGS. 1, 2 and 7. Movement onto the receiving station 86 is assisted by employment of use of the rollers 30 as traction rollers and by appropriate pop-up chain drive belts 80, FIGS. 3, 4, 5 and 6. Once in position on the outflow conveyor 17, power rollers of the conveyor are available to dispose of the unit 18.

Figure 7:
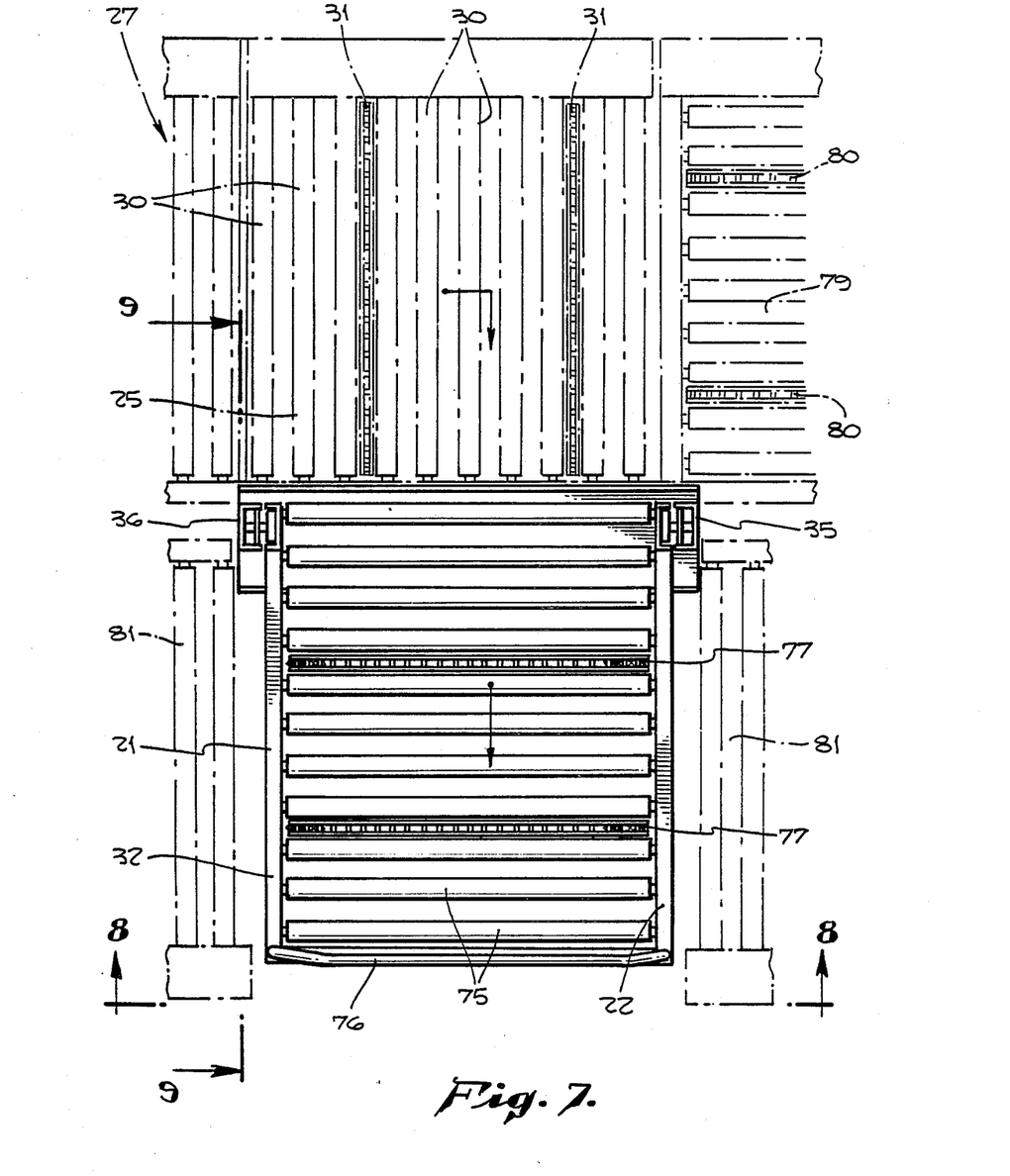
FIG. 7 is a plan view of the work table shown in association with a fragment of a supply conveyor.

As a further alternative suggested in FIG. 7, the work table 21 may be used to serve auxiliary conveyors 81 from a level position of the platform 22 at any horizontal location between the lowermost level of FIG. 9 and the uppermost level of FIG. 10.

By virtue of the structural independence of the work table, still other alternatives are inherent in the device. For example, the lowermost level of the platform may be adjusted to one below the bottom level of the adjacent vertical conveyor 12 or 13 so that units 18 may be passed to a conveyor traveling underneath. Also the platform 22 may be set in a tilt position to receive units by gravity deposit rather than by traction rollers as described on a horizontal plane.

Although only a forward tilt has been shown and described, should occasion require, the platform may be set to provide a rearward tilt for return of the units 18 by gravity to the transition table 25, as by changing the hinge 45 and the length of extension of the hydraulic ram 46.

Figure 5:
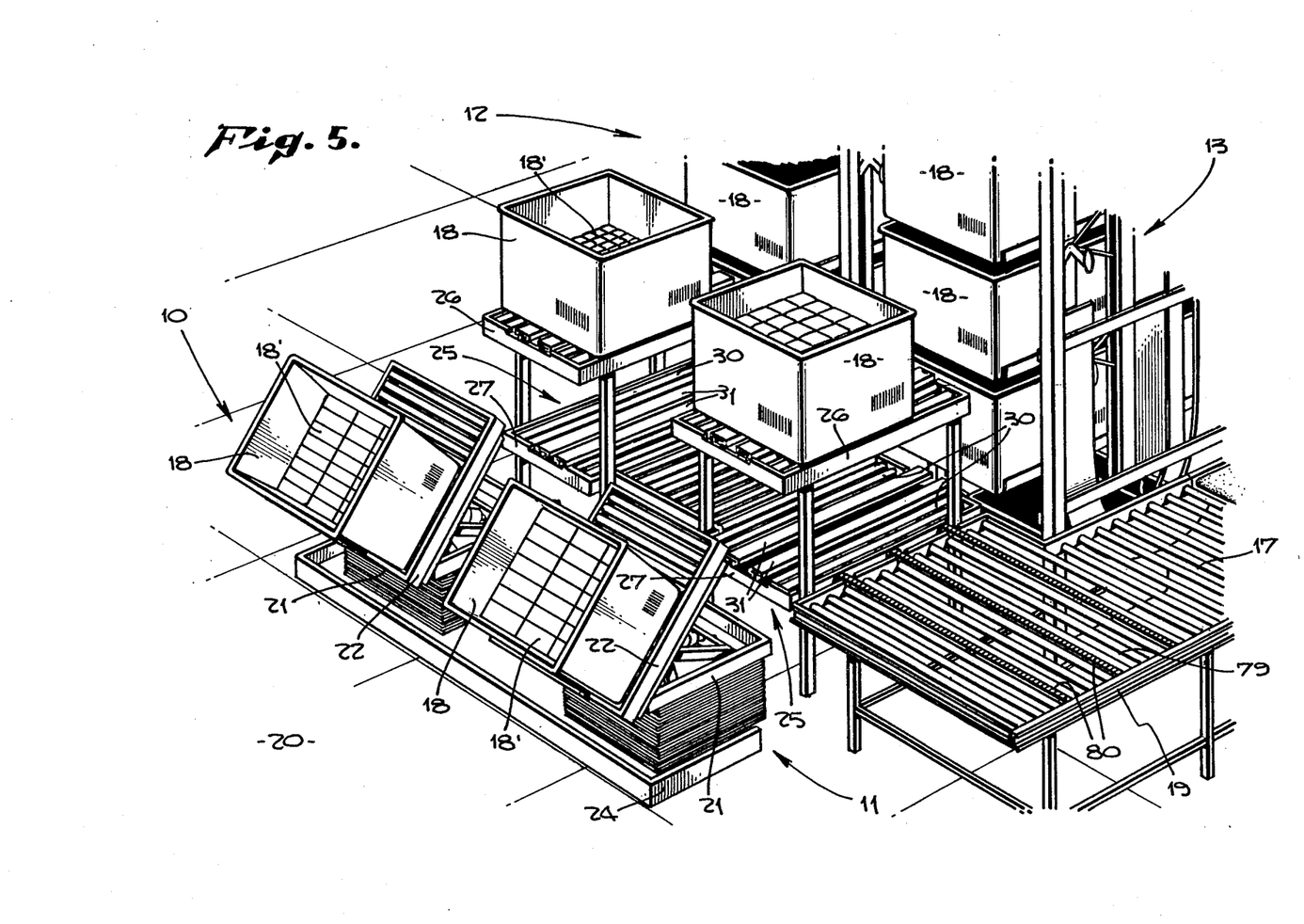
FIG. 5 is a view similar to FIG. 4, but with parts in another attitude of operation.

Advantages reside in the structure described which enable locating work tables in side-by-side relationship served by independent conveyors. In that the work stations operate independently, an operator can call to the left-hand station units 18 with one type of contents and to the righthand work station units 18 having another type of contents. Containers may reach opposite sides at different times as suggested in FIG. 4, or simultaneously as suggested in FIG. 5. With the containers of both stations tilted to working position, as shown in FIG. 5, the contents of the containers can be readily interchanged. From these positions, the containers and contents are returned from the work stations to the lower level of the corresponding transition tables 25. From there, units of either or both work stations can be returned to the corresponding vertical conveyors, or units from either or both work stations can be shifted in a right angular direction from the transition tables to the receiving station 79 of the outflow conveyor 17.

Figure 6:
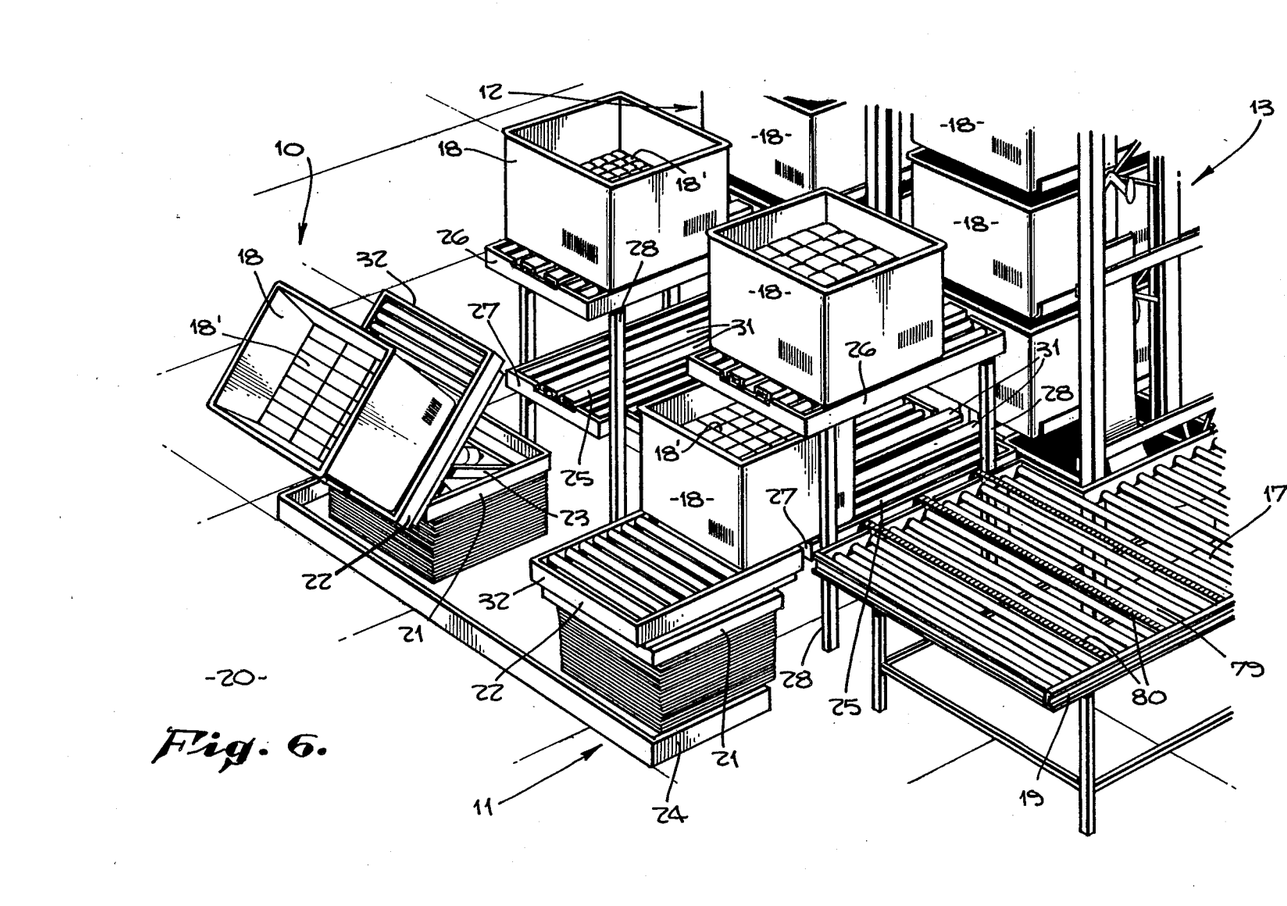
FIG. 6 is a view similar to FIG. 4, but showing the parts in still another attitude of operation.

Units 18 from the lower platform 27 of the left-hand work station can readily travel, first through the lower level of the right-hand work table 27, as viewed in FIG. 6, for example, to the receiving station 79. Additionally, for all types of containers and all types of contents, an operator can readily adjust the working height of the tilted unit so as to be able to handle the contents with the greatest speed and ease, and with a relatively minimum expenditure of physical effort and consequent time-saving efficiency.

Still further, because of the independent character of the two work stations, in the embodiment of the invention disclosed, the performance of both work stations, though differing one from another in keeping with the operator's needs, can handle units in whatever sequence might be desired. Because virtually all steps are power operated, they can be readily keyed to a common control system capable of controlling the movement and location of every unit in the system at virtually any stage.

While a particular embodiment of the present invention has been shown and described, it will be obvious to those skilled in the art that changes and modifications may be made without departing from the invention in its broader aspects, and therefore the aim of its appended claims is to cover all such changes and modifications as fall within the true spirit and scope of the invention.

Having described the invention, what is claimed as new in support of Letters Patent is as follows:

1. A work station for use with material transport units in operative relationship with a vertically moving endless storage conveyor equipped with a frame carrying a plurality of vertically spaced individual storage shelves for said units arranged in an endless loop, the storage conveyor including motive means for driving said shelves about said frame, said work station comprising a work table for holding said units to provide an operator with access to the units, said work table having a reception position for receiving selected units from the storage conveyor, a working position for providing the operator with access to the units and a disposal position for discharging units from the work table, a transition table at a fixed location between said work table and one of said storage locations, the transition table including a pair of vertically spaced unit carrying platforms, each including unit moving means for transferring said units from the unit carrying platform, a first said unit carrying platform being in operative relationship with said work table when the work table is in said reception position for passing said units from said storage conveyor to said work table, a disposal conveyor for said units, the disposal conveyor having a loading end and a disposal end, said loading end being in operative relationship with a second one of said unit carrying platforms.

2. A work station as in claim 1 wherein said working position of the work table is in a tilted position, the disposal position of the work table is a horizontal position and the position of said first platform is at substantially the same horizontal position as the disposal position of said work table.

3. A work station as in claim 1 wherein said working position of the work table is a tilted position, the disposal position is a horizontal position and the position of one of said platforms when in unit supporting condition is at substantially the same horizontal position as the disposal position of said work table.

4. A work station as in claim 1 wherein the working position of the work table is a tilted position.

5. A work station as in claim 1 wherein there is a plurality of work tables at adjacent locations with a transition table for each work table, the loading end of said disposal conveyor being in operative relationship with the second said platform of each said transition table.

6. A work station as in claim 1 wherein said moving means comprises a set of horizontally spaced traction rollers with axes of rotation extending in a first direction and a plurality of horizontally spaced traction treads with axes of movement in a second direction parallel with respect to axes of rotation of said traction rollers, one of said directions being coincident with a direction of movement of units between said transition platform and said work table.

7. A work station as in claim 1 wherein there is a supporting base for said work table and said transition table and a moving mechanism between said supporting base and said work table adapted to move said work table between said reception position, said working position and said disposal position.

8. A work station as in claim 7 wherein said moving mechanism includes means for moving said work table to different positions relative to said supporting base whereby to adjust the work table to tilted positions at different working levels.

9. A work station as in claim 7 wherein said moving mechanism comprises a tilting and vertically extendable shelf structure and power means having operating connections to respectively said shelf structure and said supporting base.

10. A work station as in claim 9 wherein said power means is a hydraulic one.

11. A work station for use in operative relationship with a supply means including a vertically moving endless storage conveyor adapted to hold a multiplicity of containers adapted to carry material goods, and a driven disposal conveyor means for carrying containers away from the work station, the disposal conveyor having a loading end and a disposal end, the work station being arranged to provide an operator with access to the containers and comprising:

a work table including a vertically moving container supporting platform having a reception position for receiving containers, a working position for providing an operator with access to received containers, and a disposal position for transferring containers from the work table;

means for vertically moving said supporting platform between said reception, working and disposal positions;

a transition table located between said work table and said supply means, said transition table having a pair of vertically spaced apart transition platforms each having unit moving means for transferring said containers from the transition platforms and including a first transition platform in operative relationship with said work table when the work table is in said reception position for transferring containers from said supply means onto said work table, and a second transition platform in operative relationship with said work table when the work table is in said disposal position for transferring containers from said work table to said disposal conveyor;

wherein containers received from said supply means pass over said first transition platform prior to being introduced to said work table and containers released from said work table pass over said second transition platform prior to being passed to said disposal conveyor.

12. A work station as recited in claim 11 wherein the working position of said work table is a tilted position.

* * * * *

UNITED STATES PATENT AND TRADEMARK OFFICE
CERTIFICATE OF CORRECTION

PATENT NO. : 4,909,697
DATED : March 20, 1990
INVENTOR(S) : CLAY BERNARD, II AND ROBERT D. LICHITI It is certified that error appears in the above—identified patent and that said Letters Patent is hereby corrected as shown below:

IN THE SPECIFICATION:

Column 5, line 17, delete "(not shown)" and insert --77--.

Signed and Sealed this

Ninth Day of July, 1991

Attest:

HARRY F. MANBECK, JR.

Attesting Officer

Commissioner of Patents and Trademarks